United States Patent
Maeda (10) Patent No.: US 8,078,035 B2
(45) Date of Patent: Dec. 13, 2011

(54) IMAGE DATA RECORDING APPARATUS

(75) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1517 days.

(21) Appl. No.: 11/465,576

(22) Filed: Aug. 18, 2006

(65) Prior Publication Data

US 2006/0280450 A1    Dec. 14, 2006

Related U.S. Application Data

(62) Division of application No. 10/067,113, filed on Feb. 4, 2002, now Pat. No. 7,127,150.

(30) Foreign Application Priority Data

Feb. 7, 2001 (JP) .................................. 2001-031245

(51) Int. Cl.
*G11B 27/00* (2006.01)
(52) U.S. Cl. ........................................................ 386/278
(58) Field of Classification Search .................. None
See application file for complete search history.

(56) References Cited

U.S. PATENT DOCUMENTS 6,115,037 A * 9/2000 Sumiyoshi et al. ........... 715/726
6,236,802 B1   5/2001 Yamamoto
6,671,323 B1 * 12/2003 Tahara et al. ............ 375/240.26

FOREIGN PATENT DOCUMENTS

| JP | 11-04555 A   | 4/1989 |
| JP | 01-152876 A  | 6/1989 |
| JP | 10-248048 A  | 9/1998 |
| JP | 11-205754 A  | 7/1999 |

OTHER PUBLICATIONS

The above foreign references were cited in a Feb. 2, 2010 Japanese Office Action, that issued in Japanese Patent Application No. 2001-031245.

* cited by examiner

*Primary Examiner* — William Vaughn, Jr.
*Assistant Examiner* — Daniel Tekle
(74) *Attorney, Agent, or Firm* — Cowan, Liebowitz & Latman, P.C.

(57) ABSTRACT

An apparatus for generating reproduction list data which designates reproduction of modified image data generated using first image data recorded in a recording medium, in response to an instruction for stopping the recording of the first image data with respect to the recording medium, and for recording the reproduction list data and modified image data in the recording medium.

5 Claims, 6 Drawing Sheets

DIGITAL EFFECT MENU

EFFECT SELECT ··· EFFECT

EFFECT ··· ↱ MOSAIC
        301  ART
               MONOCHROME
               NEGATIVE

RETURN

FIG. 4

ON SELECTING MOSAIC

FIG. 5

DIGITAL EFFECT MENU

EFFECT SELECT ··· FADER
FADER ···↗ AUTO FADE
      301  MOSAIC
             SCROLL
             WIPE

RETURN

FIG. 6

ON SELECTING AUTO FADE

IMAGE DATA RECORDING APPARATUS

CROSS-REFERENCE TO RELATED APPLICATIONS

This application is a divisional of application Ser. No. 10/067,113, filed Feb. 4, 2002 now U.S. Pat. No. 7,127,150, the entire disclosure of which is hereby incorporated by reference.

BACKGROUND OF THE INVENTION

1. Field of the Invention

The present invention relates to an image data processing apparatus, particularly to an edition processing of moving image data.

2. Related Background Art

In recent years, there has been a digital video camera which has a digital effect function for subjecting a photographed image to a special effect processing such as fade, wipe, and dissolve, and for recording the image.

However, in a conventional video camera, since the processing of special effects such as fade and wipe is applied directly to image data when it is recorded, it is impossible to delete only the added effect later, or to replace the added effect with another effect. When an original image not subjected to the effect processing is required later for edition, the original image data cannot be obtained.

Moreover, in recent years, a method has also been performed which includes the steps of: recording the image data without any effect during photographing; and subjecting the recorded image data to the effect processing later during the edition. However, it is a very laborious work to edit the image data after the photographing.

Furthermore, in order to execute a complicated special effect processing with respect to the image data in real time, highly efficient systems such as exclusive-use hardware, CPU having a high processing ability, and a large-capacity memory are necessary.

SUMMARY OF THE INVENTION

An object of the present invention is to solve the aforementioned problem.

Another object of the present invention is to provide an apparatus in which a special effect processing for image data can easily be realized, and a laborious edition operation is eliminated.

Another object of the present invention is to provide an apparatus in which the image data used as an original image can easily be restored.

Still another object of the present invention is to provide an apparatus in which a highly complicated effect can be achieved irrespective of a reproduction environment.

To achieve these objects, according to an aspect of the present invention, there is provided a recording apparatus comprising:

image pickup means;

a recording medium interface adapted to record first image data obtained by the image pickup means in a recording medium;

reproduction list processing means for generating reproduction list data which designates reproduction of modified image data generated using the first image data recorded in the recording medium; and control means for controlling the recording medium interface to record the reproduction list data generated by the reproduction list processing means and the modified image data in the recording medium.

Other objects and characteristics of the present invention will be apparent by detailed description of embodiments of the present invention with reference to the accompanying drawings.

DETAILED DESCRIPTION OF THE PREFERRED EMBODIMENTS

An embodiment of the present invention will be described hereinafter.

Figure 1:
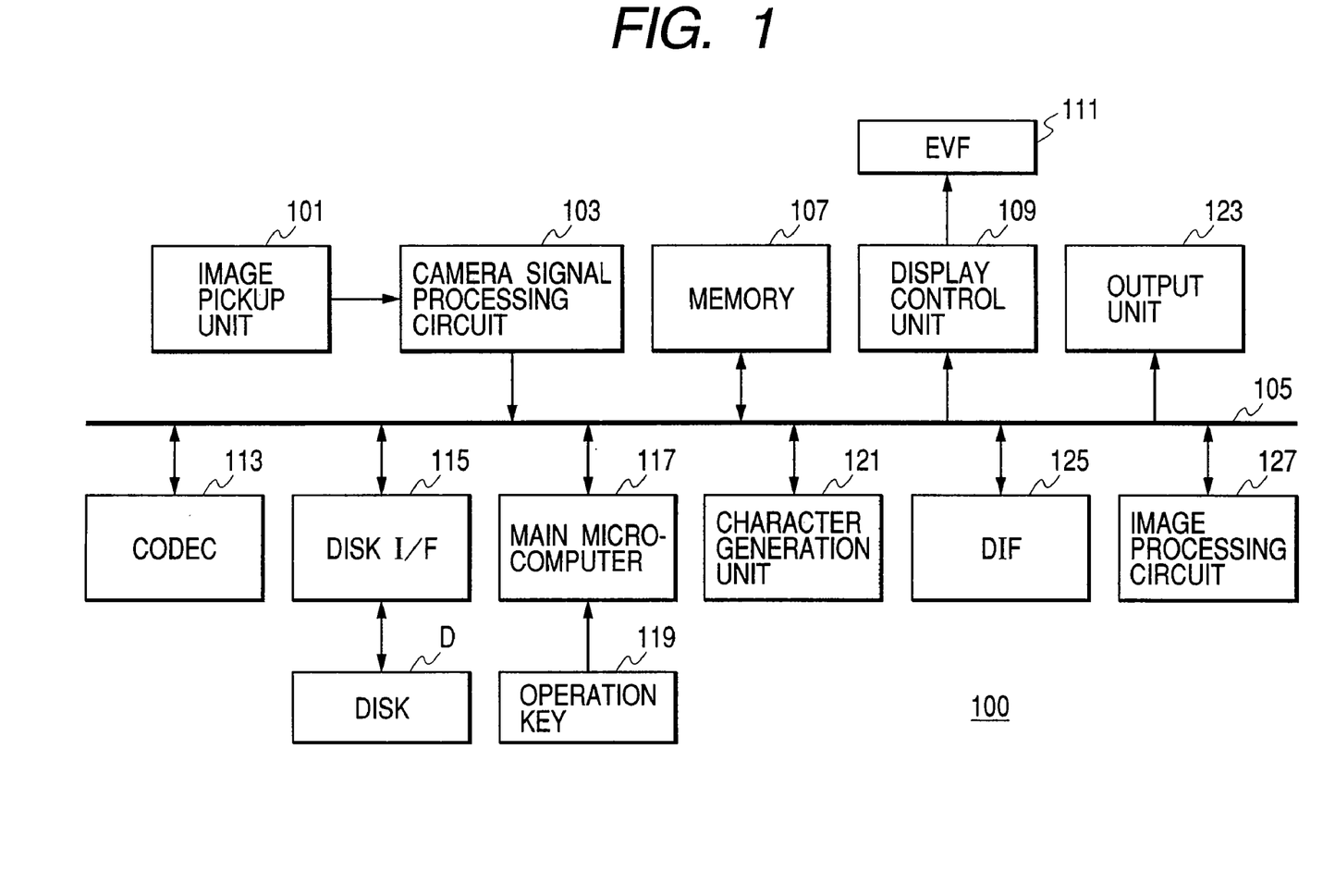
FIG. 1 is a block diagram showing a constitution of a video camera to which the present invention is applied.

FIG. 1 is a block diagram showing a constitution of a video camera 100 to which the present invention is applied. In the video camera of the present embodiment, photographed image data is coded in a form of a transport stream of MPEG2 (hereinafter referred to as MPEG2-TS), and recorded/reproduced with respect to optical magnetic disks such as DVD-RAM.

In FIG. 1, a reference numeral 101 denotes an image pickup unit, 103 denotes a camera signal processing circuit for processing the image data from the image pickup unit 101, 105 denotes a bus for transferring the image data and control data among respective components of the video camera 100, 107 denotes a memory, 109 denotes a display control unit for controlling a display operation of an EVF 111, and 111 denotes the EVF including a liquid crystal panel, and the like.

Moreover, a reference numeral 113 denotes a CODEC for coding/decoding the image data in accordance with the MPEG2, 115 denotes a disk I/F for recording/reproducing the image data and other control data with respect to a disk D, 117 denotes a main microcomputer for controlling an operation of the video camera 100, 119 denotes various operation keys, 121 denotes a character generation unit for generating character images such as a menu, 123 denotes an output unit for converting the image data into a form which conforms to an external apparatus and for outputting the converted data, 125 denotes a digital I/F (hereinafter referred to as DIF) for outputting the image data in a coded form to the external apparatus, and 127 denotes an image processing circuit for subjecting the image data to various types of effect processing.

Figure 2:
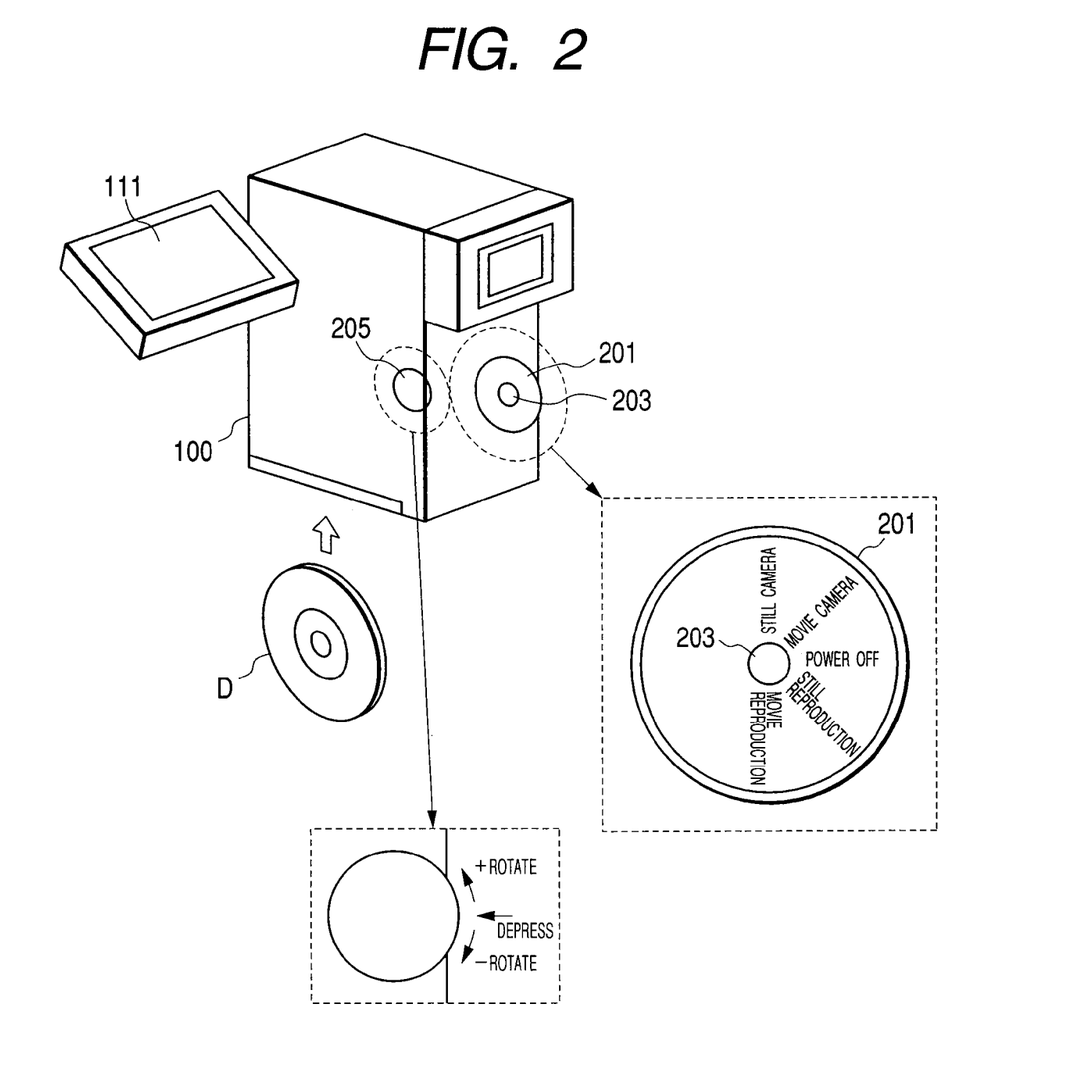
FIG. 2 is an appearance diagram of the video camera.

Furthermore, FIG. 2 is a diagram showing an appearance of the video camera 100 of FIG. 1.

As shown in FIG. 2, the EVF 111 is attached to a main body of the camera 100. Additionally, a reference numeral 201 denotes a main dial for setting an operation mode of the video camera 100; 203 denotes a trigger key for instructing a recording start and end, when the main dial 201 sets a movie camera mode; and 205 denotes an operation dial for setting a function of the video camera 100 in detail. The main dial 201, trigger key 203, and operation dial 205 are all included in the operation key 119 of FIG. 1.

A user can operate the main dial 201 of FIG. 2 to set the operation mode of the video camera 100. In the main dial 201, a still camera mode is a mode for recording the image data of one frame as a still image in the disk D in response to the operation of the trigger key 203, and the movie camera mode is a mode for recording moving image data in the disk D in response to the operation of the trigger key 203. Moreover, a still reproduction mode is a mode for reproducing only the still image data from the disk D, and a movie reproduction mode is a mode for reproducing mainly the moving image data from the disk D.

Furthermore, in the present embodiment, the disk D can easily be inserted or ejected with respect to the video camera 100 with a slot portion and eject mechanism (not shown).

An operation of the video camera 100 according to the present embodiment will be described hereinafter. Here, only the movie camera mode and movie reproduction mode will be described, and description of the still camera mode and still reproduction mode will be omitted.

A normal recording operation in the movie camera mode will first be described.

When the main dial 201 of FIG. 2 sets the movie camera mode and the trigger key 203 is operated, the recording is then started.

The moving image data obtained by the image pickup unit 101 is subjected to a known camera signal processing in the camera signal processing circuit 103, and written into the memory 107 via the bus 105. Moreover, the CODEC 113 reads out the image data from the memory 107, codes the read-out data in the form conforming to the MPEG2, and writes the coded data into the memory 107 again. The disk I/F 115, which has a mechanism for driving a known optical laser pickup, magnetic head, and disk D, reads out the coded image data from the memory 107, and records the read-out data onto the disk D. Furthermore, when the trigger key 203 is operated again, the main microcomputer 117 controls the CODEC 113 and disk I/F 115 to stop the recording of the image data.

In the present embodiment, after instruction of the recording start by the trigger key 203, a series of moving image data recorded until the trigger key 203 is operated again to instruct the recording stop, is recorded as one file on the disk D.

Moreover, in this case, the display control unit 109 displays a moving image in the EVF 111 in accordance with the moving image data obtained by the image pickup unit 101. Furthermore, the main microcomputer 117 controls the character generation unit 121 to generate a character indicating an operation state and mode of the camera, and output the character to the display control unit 109. The display control unit 109 superposes the character upon the moving image to display the character in the EVF 111.

A processing performed in response to an instruction of a digital effect in the movie camera mode will next be described.

Figure 3:
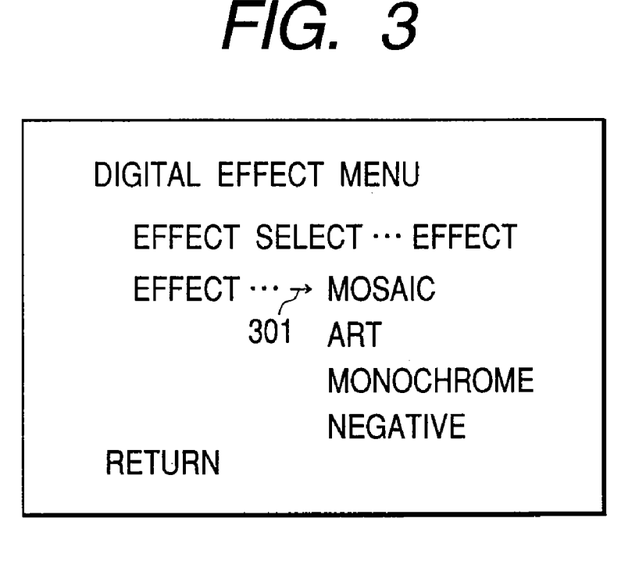
FIG. 3 is a diagram showing a menu screen.

First, the user depresses the operation dial 205 as shown in FIG. 2 in a case that the movie camera mode is set. Then, the main microcomputer 117 controls the character generation unit 121 and display control unit 109, so that an effect menu shown in FIG. 3 is displayed in the EVF 111. In this state, first the operation dial 205 is rotated to move an index 301 to item "EFFECT SELECT", and then the operation dial is depressed to select a changeover of an effect mode. If the operation dial 205 is rotated in this state, the effect mode changes in response to the rotation. Then, when a desired effect mode is selected, the operation dial 205 is to be depressed again.

Subsequently, the operation dial 205 is rotated to move the index 301 to the item of a desired effect processing and then the operation dial 205 is depressed so that a type of effect is determined.

FIG. 3 shows that "EFFECT" is selected as the effect mode, and "MOSAIC" is selected as the type of the effect.

Thereafter, the user rotates the operation dial 205 to align the index 301 with "RETURN", and then depresses the operation dial 205 so that a menu display is turned off.

Figure 4:
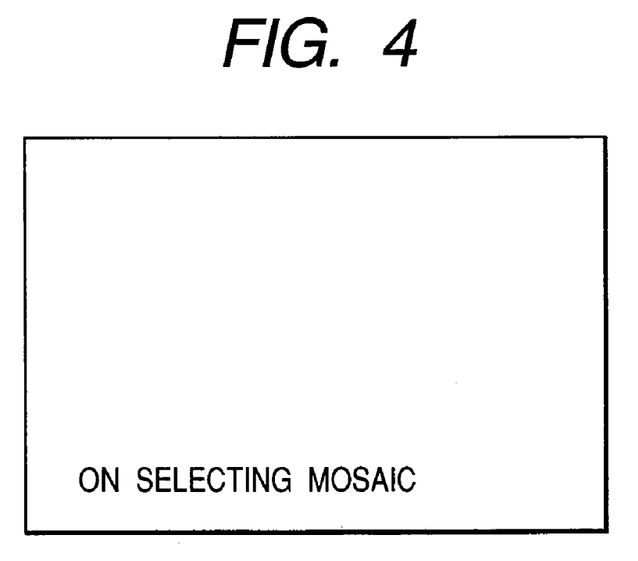
FIG. 4 is a diagram showing a state of an EVF screen.

When the effect of mosaic is selected, the main microcomputer 117 controls the character generation unit 121 to display the character indicating the selection of the mosaic processing in the EVF 111 in a recording pause state and during the recording as shown in FIG. 4.

Additionally, when the trigger key 203 is operated in this state, the main microcomputer 117 codes the image data from the image pickup unit 101 as described above, and records the coded data on the disk D. Moreover, a normal image not subjected to the mosaic processing is displayed in the EVF 111.

In this case, in the present embodiment, the mosaic processing is selected as the digital effect. However, when the moving image data is picked up and recorded, the image data is not directly subjected to the mosaic processing and thus is coded and recorded on the disk D similarly as a normal recording.

Subsequently, when the trigger key 203 is operated again, the main microcomputer 117 stops the recording of the moving image data with respect to the disk D.

A most characteristic feature of the video camera according to the present embodiment will next be described.

In the present embodiment, after the recording of the image data is stopped by the operation of the trigger key 203, the moving image data just recorded on the disk D is reproduced and decoded. The decoded image data is subjected to a designated effect processing, and modified image data is then generated and again coded. The data thus coded is recorded as data separate from the original moving image data on the disk D.

That is, when the trigger key 203 instructs the recording stop, the main microcomputer 117 controls the disk I/F 115 to stop the recording of the moving image data and reproduce the file of the just recorded moving image data from the disk D.

Subsequently, the main microcomputer 117 controls the CODEC 113 to decode the reproduced image data, and sends the decoded data to the image processing circuit 127. Moreover, the main microcomputer 117 controls the image processing circuit 127 to subject the decoded image data to the designated effect processing, that is, the mosaic processing here, and outputs the data as modified image data to the CODEC 113 again. The CODEC 113 codes the modified image data generated by the image processing circuit 127 in accordance with the MPEG2, and outputs the coded data to the disk I/F 115. The disk I/F 115 records a string of modified image data outputted from the CODEC 113 as a file different from the original moving image data on the disk D.

Here, the image processing circuit 127 uses the memory 107 to generate the modified image data, but since the image data subjected to the effect processing is the moving image data, it is sometimes impossible to process the data in real time depending upon the type of the effect processing. In this case, the main microcomputer 117 may control the disk I/F 115, CODEC 113, and image processing circuit 127 so as to reproduce each predetermined amount of image data from the disk D and generate the modified image data in accordance with a processing ability of the image processing circuit 127.

For example, in the MPEG2, since a unit of image data including several frames called GOP is subjected to a coding processing, the moving image data may be reproduced from the disk D to generate the modified image data on the GOP basis.

Moreover, a data rate of the disk I/F 115 at a recording/reproducing operation is several times to several tens of times as large as a data rate of the coded moving image data, and therefore the image data is intermittently recorded or reproduced at a ratio of once per several rotations of the disk D. Therefore, it is possible to record the modified image data on the disk D while reproducing the original image data from the disk D.

Additionally, when such a series of modified image data is generated and recorded on the disk D, the main microcomputer 117 generates reproduction list data indicating a reproduction procedure of the image data recorded on the disk D in order to reproduce the modified image data instead of the original image data.

Here, a reproduction list will be described.

In recent years, a description language for controlling a reproduction processing of the moving image data, sound data, and the like has been proposed.

Examples of the language include a synchronized multimedia integration language (SMIL). The SMIL can designate synchronous reproduction of the image data such as a moving image and still image, successive reproduction, or reproduction processing of other media data such as text and sound. Moreover, a special effect applied when the display of the image data is switched, and the like can also be designated.

In the present embodiment, this SMIL is used to generate the reproduction list, and the list is recorded on the disk D.

That is, the main microcomputer 117 records the modified image data in the disk D as described above, and thereafter generates the reproduction list data designating a reproduction operation so that the modified image data is reproduced instead of the original moving image data recorded on the disk D. Subsequently, the main microcomputer outputs the reproduction list data to the disk I/F 115 to record it as one file on the disk D.

As described above, according to the present embodiment, when the moving image data is picked up in the movie camera mode and there is an instruction for the digital effect in that case, the modified image data subjected to the effect processing and the reproduction list data for instructing the reproduction of the modified image data are recorded onto the disk in addition to the original moving image data.

An operation for reproducing the moving image data recorded on the disk D in this manner will next be described.

When the main dial 201 is operated to set the movie reproduction mode, the main microcomputer 117 controls the disk I/F 115 to reproduce the reproduction list data recorded on the disk D, and stores the reproduced data in an internal memory. When a reproduction key included in the operation key 119 is operated in this state, the main microcomputer 117 controls the disk I/F 115 so as to reproduce the modified image data instead of the original moving image data as described above in accordance with the reproduction list reproduced beforehand.

The disk I/F 115 reproduces the modified image data from the disk D to output the reproduced data to the CODEC 113. The CODEC 113 decodes the reproduced modified image data and outputs the decoded data to the display control unit 109 and output unit 123. As a result, the moving image subjected to the effect processing is displayed in the EVF 111. Moreover, the output unit 123 outputs data representing the moving image subjected to the mosaic processing, for example, to an external monitor.

On the other hand, the modified image data reproduced by the disk I/F 115 is outputted to the DIF 125 in the coded form. The DIF 125 converts the reproduced modified image data of the coded form into a form which conforms to IEEE 1394, and outputs the converted data to the external apparatus. Subsequently, the external apparatus decodes the modified image data outputted from the DIF 125, so that the moving image data subjected to the mosaic processing can be obtained.

Moreover, if the reproduction list data is not recorded on the disk D, the main microcomputer 117 controls the disk I/F 115 to select a predetermined image file from the disk D and to reproduce the selected file.

A processing for reproducing the original image data, even when the reproduction list data and modified image data are recorded together with the original image data on the disk D will next be described.

In this case, after the movie reproduction mode is set via the main dial 201, the operation dial 205 is depressed. The main microcomputer 117 controls the character generation unit 121 in response to the operation of the operation dial 205 to display the menu of the screen of the EVF 111. The user uses this menu to set whether or not to reproduce the image data subjected to the effect processing according to the reproduction list.

Here, if the reproduction of the image data subjected to the effect processing in accordance with the reproduction list is canceled, the main microcomputer 117 ignores all the instruction of the reproduction procedure by the reproduction list data recorded on the disk D. Similarly as a normal reproduction mode, the main microcomputer controls the disk I/F 115 to select the file of the original image data not subjected to the effect processing from the disk D, and to reproduce the selected file.

As described above, according to the present embodiment, when the instruction for the digital effect is provided during photographing, after completion of the recording of the original image data, separate modified image data is automatically generated by subjecting the image data recorded on the disk to the effect processing, and is recorded on the disk. Moreover, the reproduction list data for instructing the reproduction of the modified image data instead of the original image data is generated and recorded on the disk. Therefore, it is unnecessary to perform the effect processing on the photographed image data in real time, and the effect can easily be realized.

Furthermore, the original image data is recorded as such, without being subjected to any effect processing. Therefore, if the reproduction list data is ignored during the reproduction, the original image data not subjected to the effect processing can be obtained.

Therefore, even when it is required later in edition to change the effect processing to another effect processing, such the change can easily be realized.

Moreover, in the present embodiment, since the modified image data is generated and recorded on the disk separately from the original image data, it is possible to output the effect-processed modified image data in the coded form via the DIF.

For example, when the image data recorded on the disk is reproduced to be subjected to the effect processing and outputted via the DIF as in the conventional method, it is necessary to once decode the data, subject the decoded data to the effect processing, and again code the processed data before outputting it. However, according to the present embodiment, it is unnecessary to perform such a laborious processing during the reproduction.

An operation for a fade processing selected as the effect processing in the movie camera mode will next be described.

Figure 5:
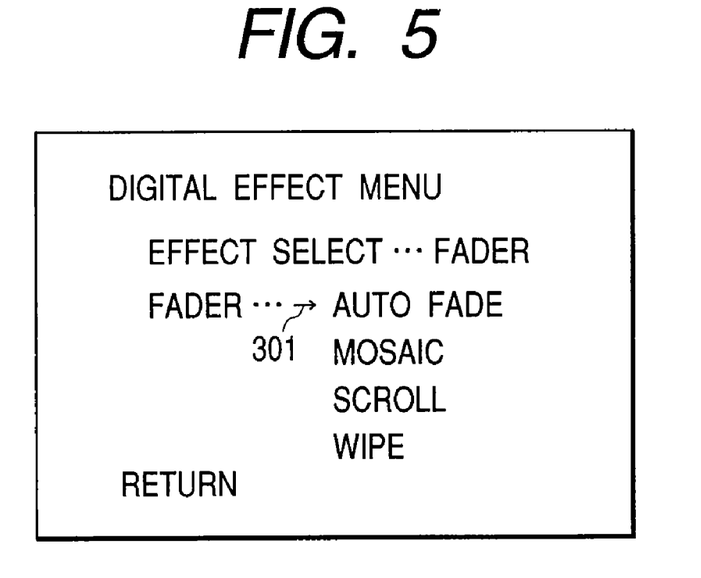
FIG. 5 is a diagram showing the menu screen.

When the operation dial 205 is depressed as described above in the movie camera mode during the photographing, the main microcomputer 117 controls the character generation unit 121 to display the menu screen shown in FIG. 5 in the EVF 111.

Figure 6:
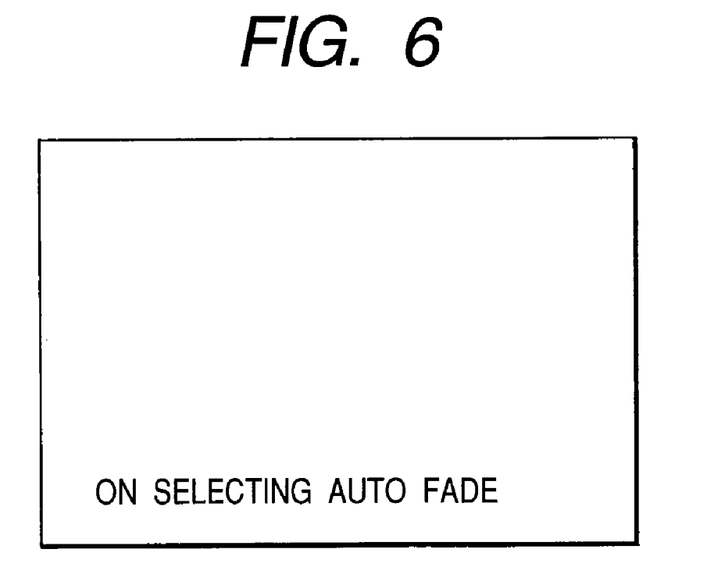
FIG. 6 is a diagram showing the state of the EVF screen.

Subsequently, the user checks the menu screen while operating the operation dial 205 as described above, to select "FADER" as the effect mode and select a desired type of fade. FIG. 5 shows that "AUTO FADE" is selected. After the auto fade is selected and the menu screen is turned off in this manner, the selection of an auto fade processing is indicated on the display of the EVF 111 as shown in FIG. 6.

When the auto fade is set as the effect in this manner and then the trigger key 203 is operated, the main microcomputer 117 codes the photographed image data as described above, and controls the CODEC 113 and disk I/F 115 to record the coded data on the disk D. Moreover, when the trigger key 203 is operated again, the moving image data is recorded on the disk D for a predetermined time, for example, five seconds in the present embodiment from the operation, and thereafter the recording is ended. In this case, the moving image data is recorded without being subjected to the fade processing, and the EVF 111 displays the image not subjected to the fade processing.

When the recording of the moving image data ends, the main microcomputer 117 controls the disk I/F 115 to reproduce from the disk D only the moving image data of the last five seconds in the just recorded moving image data. The disk I/F 115 thus reproduces from the disk D the moving image data of five seconds and outputs the reproduced data to the CODEC 113. The CODEC 113 decodes the reproduced moving image data and outputs the decoded data to the image processing circuit 127.

The image processing circuit 127 follows the instruction from the main microcomputer 117 to subject the image data outputted from the CODEC 113 to a fade-out processing and generate the modified image data so that the data gradually fades out in five seconds, and outputs the modified data to the CODEC 113. The CODEC 113 codes the modified image data again and outputs the coded data to the disk I/F 115. The disk I/F 115 records the coded modified image data as a file separate from the original image data on the disk D.

Figure 7:
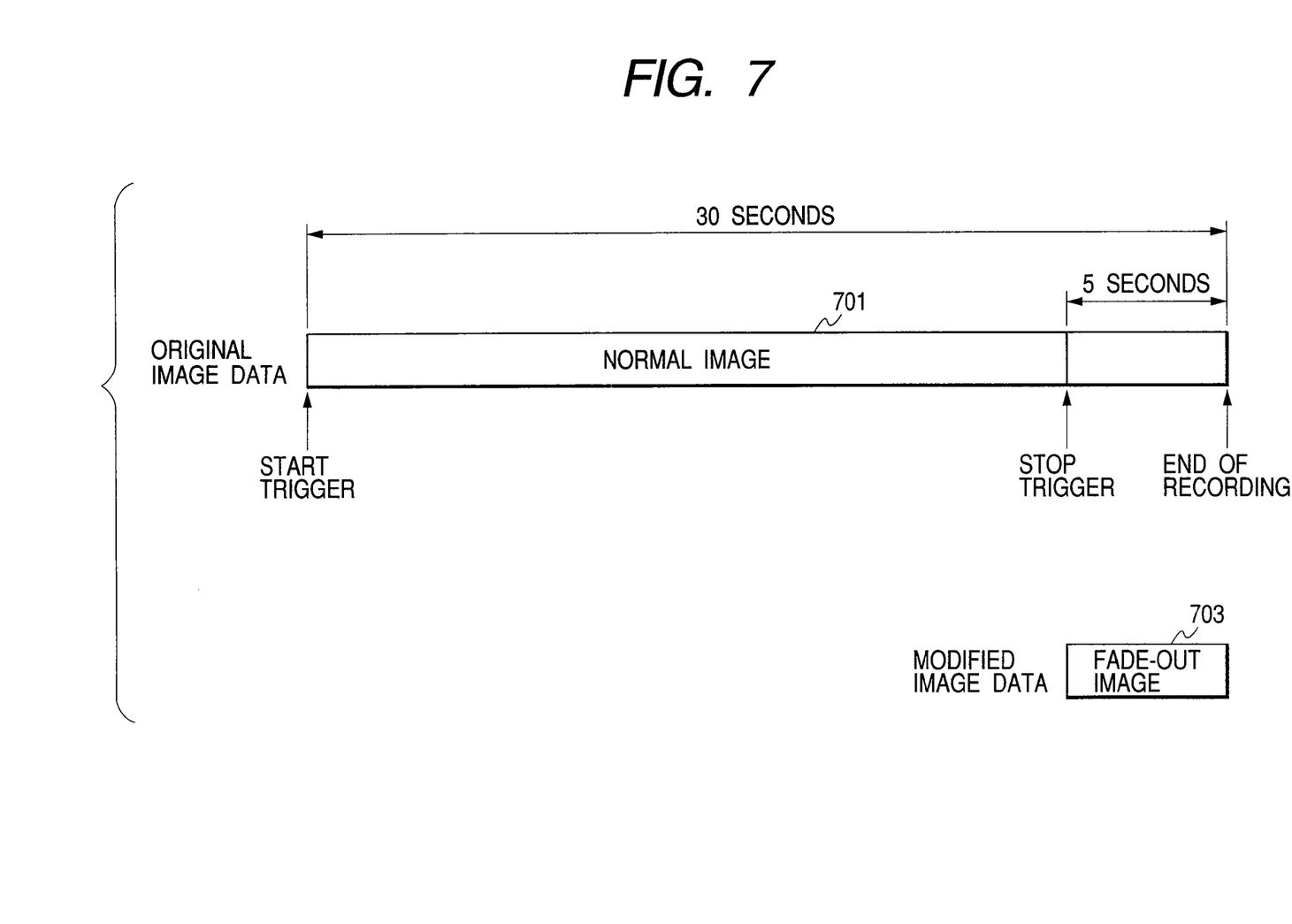
FIG. 7 is a diagram showing a state of image data recorded on a disk.

A state of the image data recorded on the disk D is shown in FIG. 7.

In FIG. 7, a reference numeral 701 denotes data which is recorded on the disk D as ordinary image data. As shown in FIG. 7, after an instruction for the end of the recording is provided, the image data is recorded for further five seconds after that instruction. Moreover, numeral 703 denotes the modified image data obtained by subjecting the image data of the last five seconds in the image data 703 to the fade-out processing.

Additionally, after the modified data representing a fade-out image is recorded on the disk D, the main microcomputer 117 generates the reproduction list data for instructing the reproduction of the modified image data representing the fade-out image similarly as the aforementioned mosaic processing.

In the present embodiment, as shown in FIG. 7, the original image data 701 is moving image data of 30 seconds, and the modified image data of the last five seconds is reproduced instead of the original image data.

Figure 8:
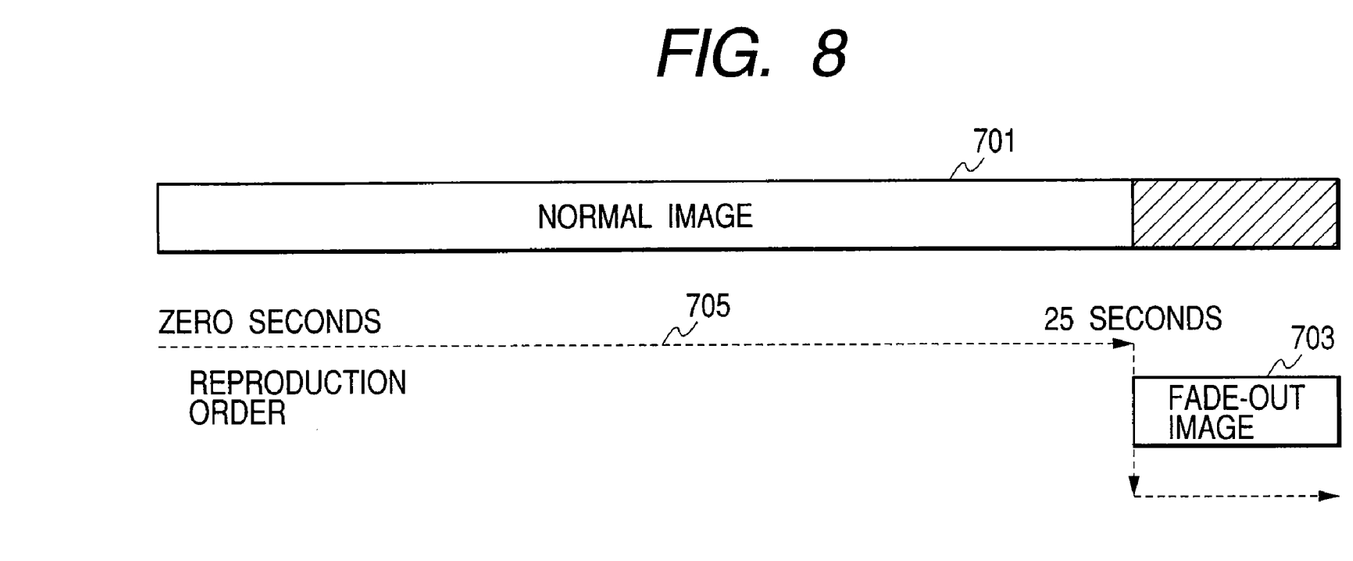
FIG. 8 is an explanatory view of a reproduction operation using modified data.

In this case, as shown by a dotted line 705 in FIG. 8, the main microcomputer 117 prepares the reproduction list data in which a reproduction procedure for reproducing the original image data 701 for 25 seconds from the head of the data and thereafter reproducing the modified image data 703 is described.

Subsequently, the reproduction list data is outputted to the disk I/F 115. The disk I/F 115 records the reproduction list data on the disk D.

To reproduce the recorded image data recorded in this manner, the main microcomputer 117 selects and reproduces the image data to be reproduced from the disk D in accordance with the reproduction list reproduced from the disk D as described above. As a result, as shown in FIG. 8, after the original image data 701 is reproduced for 25 seconds from the head, the modified image data 703 is reproduced. As a result, the fade-out image is displayed in the EVF 111 for the last five seconds of the original image data 701.

Moreover, the image data reproduced in accordance with the reproduction list is outputted in the coded form to the external apparatus via the DIF 125. Therefore, when the external apparatus decodes the image data outputted via the DIF 125, the fade-out processed image data can be obtained.

Furthermore, even in this case, the original image data of the last five seconds of the original image data is also recorded without modification. Therefore, when the modified image data is prohibited from being reproduced, the original image data can be reproduced.

Additionally, in the present embodiment, the subjecting of the recording end portion to the fade-out processing has been described. For example, if the fade processing is set during a recording pause, a fade-in processing can also be applied over a predetermined period from the recording start, for example, for five seconds.

Another embodiment of the present invention will next be described.

In the above-described embodiment, after ending the recording of the original image data, the main microcomputer 117 generates the modified image data. However, usually in mobile apparatuses such as the video camera, because of restrictions on a size and cost, a high-degree effect processing cannot be performed, or much time is sometimes required.

To solve the problem, in the present embodiment, after the end of the recording of the original image data, the original image data is reproduced from the disk and outputted to an external editing apparatus having a higher ability via the DIF. Moreover, in the present embodiment, after the editing apparatus generates the modified image data, the data is again coded, outputted to the video camera via the DIF, and recorded on the disk.

Figure 9:
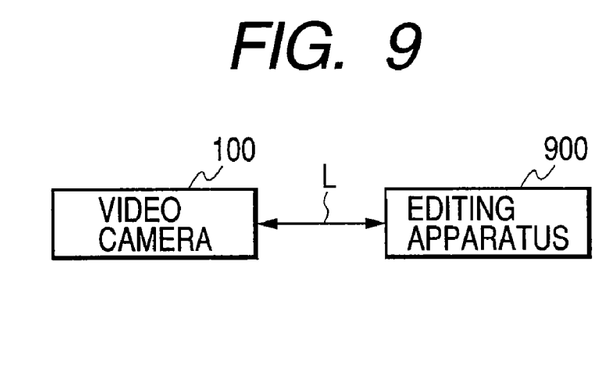
FIG. 9 is a diagram showing a constitution of a system to which the present invention is applied.

FIG. 9 is a diagram showing the constitution of a system according to the present embodiment.

As shown in FIG. 9, in the present embodiment, the video camera 100 shown in FIG. 1 is connected to an editing apparatus 900 via a line L of the DIF.

A processing for a photographing time in the system constituted in this manner will next be described.

When the video camera 100 records the moving image as described above and the user operates the trigger key to stop the recording, the main microcomputer 117 of the video camera 100 reproduces from the disk D the moving image data necessary for generating the modified image data, and outputs the reproduced data in the coded form to the editing apparatus 900 via the DIF 125.

For example, when the mosaic is designated as shown in FIG. 3, all files of one moving image data are reproduced and outputted to the editing apparatus 900. Instead, when the auto-fade is designated as shown in FIG. 5, only the image data of the last five seconds of the original image data is reproduced and outputted to the editing apparatus 900.

Furthermore, the main microcomputer 117 controls the DIF 125 also to output to the editing apparatus 900 control information designating the effect processing to be applied to the outputted image data.

The editing apparatus 900 includes a CPU having a high capability, large-capacity memory, HDD, and the like, subjects the image data outputted from the video camera 100 to the designated effect processing, and outputs the modified data to the DIF 125 via the connection line L.

When the editing apparatus 900 sends the modified image data to the main microcomputer 117, the main microcomputer records the received data on the disk D by the disk I/F 115.

Thereafter, the main microcomputer controls the disk I/F 115 to generate the reproduction list data and to record the generated data on the disk D as described above.

As described above, according to the present embodiment, after the end of the recording of the image data, the image data reproduced from the disk is transmitted to the external editing apparatus to automatically generate the modified image data subjected to the effect processing. Additionally, the reproduction list data for instructing the reproduction of the modified image data is automatically generated and recorded on the disk on which the original image data is recorded. Therefore, a high-degree effect processing can easily be realized.

Additionally, in the aforementioned embodiment, the present invention applied to the video camera for recording/reproducing the image data with respect to the magnetic optical disk has been described. However, the present invention can also be applied to the recording/reproducing of the image data with respect to random access mediums such as a semiconductor memory card.

Moreover, in the embodiments, they describe that the program data is described in the SMIL. However, the data can also be described in an extensible markup language (XML), standard generalized markup language (SGML), hyper text markup language (HTML), and the like.

Furthermore, in the embodiment, the coding/decoding processing of the image data, generation processing of the modified image data, and the like are realized by the hardware arrangement, but may also be realized by a software processing using a microcomputer.

In this case, a program code of software realizes the aforementioned function of the embodiment. The program code and means for supplying the program code to the computer, such as a storage medium with the program code stored therein, constitute the present invention. Examples of the storage medium for storing the program code include a floppy disk, hard disk, optical disk, optical magnetic disk, CD-ROM, magnetic tape, nonvolatile memory card, ROM, and the like.

Moreover, the computer executes the supplied program code, so that the function described above in the embodiment is realized. Additionally, even when the function described above in the embodiment is realized in cooperation of an operating system (OS) having the program code operated in the computer, or another application software, the program code is included in the scope of the present invention.

Furthermore, the supplied program code is stored in a memory disposed in a function extension board of the computer or a function extension unit connected to the computer, the CPU or the like disposed in the function extension board or the function extension unit performs a part or the whole of an actual processing based on the instruction of the program code, and the function described above in the embodiment is realized by such the processing. Even this case is included in the scope of the present invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus comprising:
   an image pickup unit;
   a receiving unit that receives an image effect instruction to add an image effect to first moving image data obtained by the image pickup unit;
   a recording and reproducing unit that records the first moving image data obtained by said image pickup unit on a recording medium and reproduces the first moving image data from the recording medium, the recording and reproducing unit starting recording the first moving image data in accordance with a recording start instruction and stopping recording the first moving image data in accordance with a recording stop instruction;
   an image processing unit that adds the image effect to the first moving image data reproduced from the recording medium and generates modified image data to which the image effect is added;
   a control unit that controls recording and reproducing unit and the image processing unit,
   wherein if the receiving unit receives the image effect instruction, the control unit controls the recording and reproducing unit and the image processing unit after the recording and reproducing unit stops recording the first moving image data, such that the recording and reproducing unit automatically reproduces the first moving image data from the recording medium and the image processing unit automatically generates the modified image data by adding the image effect to the first moving image data reproduced from the recording medium after the recording and reproducing unit stops recording the first moving image data; and
   a reproduction list processing unit that generates reproduction list data for controlling a reproduction order of image data recorded on said recording medium,
   wherein if the receiving unit receives the image effect instruction, the control unit controls the recording and reproducing unit to automatically record the modified image data generated by the image processing unit on the recording medium after the recording and reproducing unit stops recording the first moving image data, and
   wherein if the receiving unit receives the image effect instruction, the control unit controls the reproduction list processing unit and the recording and reproducing unit after the recording and reproducing unit stops recording the first moving image data, such that the reproduction list processing unit automatically generates the reproduction list data for controlling the reproduction order to reproduce the modified image data from the recording medium instead of the first moving image data and the recording and reproducing unit records the reproduction list data generated by the reproduction list processing unit on the recording medium after the recording and reproducing unit stops recording the first moving image data.

2. An apparatus according to claim 1, further comprising:
   a determining unit that determines a type of the image effect,
   wherein the control unit controls the image processing unit to add the image effect of the type determined by the determining unit to the first moving image data.

3. An apparatus according to claim 1, wherein the control unit controls the image processing unit to generate the modified image data by adding the image effect to a part of the first moving image data, and the reproduction list processing unit to generate the reproduction list data for controlling the reproduction order of the first moving image data and the modified image data such that the first moving image data other than the part thereof is reproduced and thereafter the modified image data is reproduced.

4. An apparatus according to claim 1, wherein the reproduction list processing unit generates the reproduction list data using a predetermined description language.

5. An apparatus according to claim 1, further comprising:
a coding and decoding unit that encodes the first moving image data obtained by the image pickup unit and the modified image data generated by the image processing unit, and decodes the first moving image data and the modified image data reproduced from the recording medium,
wherein the image processing unit generates the modified image data by adding the image effect to the first moving image data decoded by the coding and decoding unit.

* * * * *